(12) United States Patent
Ashour et al.

(10) Patent No.: US 8,484,040 B2
(45) Date of Patent: *Jul. 9, 2013

(54) SOCIAL ANALYSIS IN MULTI-PARTICIPANT MEETINGS

(75) Inventors: Gal Ashour, Yoqneam (IL); Zak Mandel, Nesher (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/448,431

(22) Filed: Apr. 17, 2012

(65) Prior Publication Data

US 2012/0233257 A1    Sep. 13, 2012

Related U.S. Application Data

(63) Continuation of application No. 12/626,950, filed on Nov. 30, 2009, now Pat. No. 8,204,759.

(51) Int. Cl.
*G06Q 30/02* (2012.01)
*G06Q 10/10* (2012.01)
*G06Q 10/06* (2012.01)
*G06Q 30/06* (2012.01)
*G06Q 10/08* (2012.01)

(52) U.S. Cl.
USPC .......................................................... 705/1.1

(58) Field of Classification Search
None
See application file for complete search history.

(56) References Cited

U.S. PATENT DOCUMENTS

| 7,143,054 | B2 | 11/2006 | Doherty |
| 7,177,880 | B2 | 2/2007 | Ruvolo et al. |
| 7,275,068 | B2 | 9/2007 | Huberman et al. |
| 7,318,037 | B2 | 1/2008 | Solari |
| 2005/0256905 | A1 | 11/2005 | Gruhl et al. |
| 2008/0133581 | A1 | 6/2008 | MacVarish |

OTHER PUBLICATIONS

James A. Kitts, "Towards the Automated Social Analysis of Situated Speech Data", 2008. URL:http://portal.acm.org/citation.cfm?id=1409658&dl=ACM.

*Primary Examiner* — Jonathan Ouellette

(57) ABSTRACT

Methods and systems for social analysis in multi-participant meetings provide for receiving a data stream of a multi-participant meeting, wherein multiple topics are discussed. The data stream is analyzed to detect topics and to define topical sub-activities that are performed by at least a portion of the participants. Contributions to a topic by two of the participants in the topical sub-activities are identified and evaluated. A connection weight between the two participants is calculated based on the evaluation of their respective contributions.

20 Claims, 4 Drawing Sheets

SOCIAL ANALYSIS IN MULTI-PARTICIPANT MEETINGS

FIELD OF THE INVENTION

This invention relates to the field of analysis of social information. In particular, the invention relates to social analysis in multi-participant meetings.

BACKGROUND OF THE INVENTION

With growing popularity of social networks, more and more systems look for sources of social information. Weighted social networks provide extra information, such as a weight of connection between people.

Connection weight calculations are currently based on emails, instant messaging, blogs, meetings, etc. Current systems use only basic knowledge about group activities, taking into account only the participation or absence fact. This approach has disadvantages because participation in the same meeting does not necessarily point to a strong connection between two parties.

For example, in a scenario when someone organizes a review session for three groups from different geographic locations, 20 minutes for each group, there is a strong connection between reviewers and each group, but a very weak connection between reviewed groups. Another example is when multiple topics are discussed during a review meeting and in each topic discussion there is limited subset of active speakers.

Additional rich information can be extracted from group activities such as meetings and conferences. Extracting social information from a meeting, based on participants' activity can improve the accuracy of the derived knowledge.

SUMMARY OF THE INVENTION

There is provided according to embodiments of the invention a method for social analysis in multi-participant meetings, which is carried out by receiving a data stream of a multi-participant meeting, wherein multiple topics are discussed, analyzing the data stream to detect one of the topics and to define topical sub-activities that are performed by at least a portion of the participants. The method is further carried out by identifying respective contributions to a topic by two of the participants in the topical sub-activities associated therewith, making an evaluation of the respective contributions to selected ones of the topical sub-activities, and calculating a connection weight between the two participants based on the evaluation of the respective contributions. The receiving, analyzing, identifying, making and calculating steps are implemented in either computer hardware, or computer software embodied in a non-transitory, tangible, computer-readable storage medium.

According one aspect of the method, identifying respective contributions includes determining a number of the topical sub-activities common to the two participants.

According to a further aspect of the method, identifying respective contributions includes determining a number of interactions between the two participants.

Still another aspect of the method analyzing the data stream includes identifying the participants and clustering the identified participants into sub-groups for respective ones of the topical sub-activities, the method includes providing indications of the sub-groups and connection weights among pairs of the participants in the sub-groups to a social network.

According to one aspect of the method, analyzing the data stream to define topical sub-activities includes identifying the participants, demarcating the topical sub-activities by speech pauses of the identified participants, and subdividing the demarcated topical sub-activities by detecting replacement times wherein one speaker is replaced by another speaker among the identified participants.

A further aspect of the method excludes a greeting and a leaving salutation when identifying respective contributions.

According to yet another aspect of the invention, making an evaluation includes emotion detection of the two participants.

According to an additional aspect of the invention, detecting a sub-activity is based on at least one of speech analysis and text analysis.

According to one aspect of the invention, making an evaluation includes detection of an agreement or disagreement between the two participants. Calculating a connection weight is performed responsively to the agreement or disagreement.

According to still another aspect of the invention, the steps of analyzing, identifying, making an evaluation and calculating are performed during the meeting.

Other embodiments of the invention provide computer software product and apparatus for carrying out the above-described method.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A method and system are described for social analysis in multi-party meetings. Multi-party meetings may be audio or video conferences, messaging conferences, or any other form of on-line meeting or gathering with multiple parties.

The participant activity in a meeting is analysed and activity information is aggregated for weighted social networks.

This is done by detecting active groups/participants in the meeting, based on time proximity and/or speech analysis, then calculating connection weight with another participant by detecting common activities.

The raw activity information can be obtained from a conference service provider. This information is processed by the proposed system.

Figure 1:
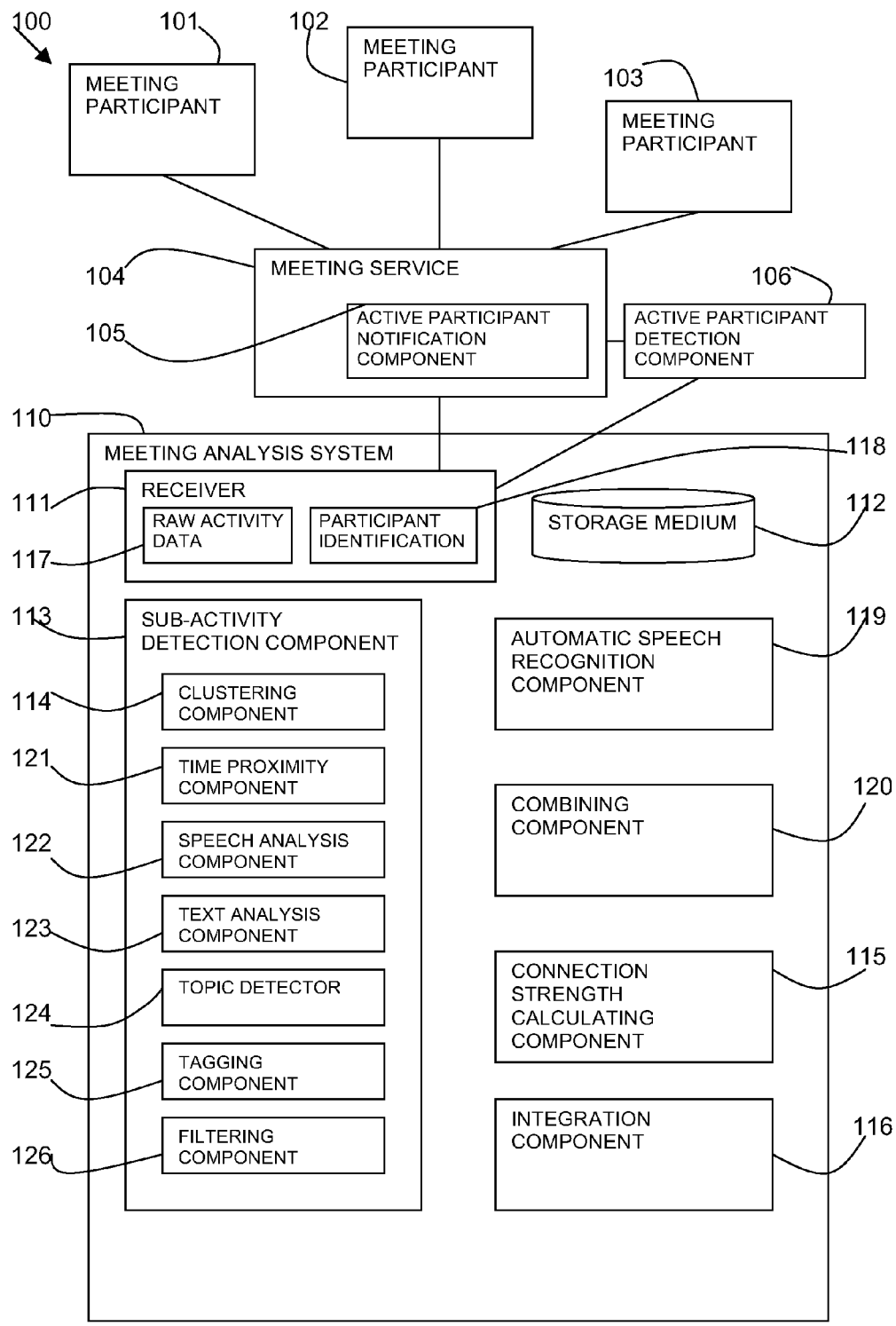
FIG. 1 is a block diagram of a system in accordance with the present invention.

Referring to FIG. 1, a block diagram shows a system 100 for social analysis. Multiple participants 101-103 participate in an on-line meeting hosted by a meeting service 104 such as a conference provider tool.

In one embodiment, the meeting service 104 may be an audio or video conference service which includes an active participant notification component 105. In video and audio conference systems, an active speaker notification component 105 is usually based on participants' voice level comparison and reporting of a loudest speaker as the active speaker, with some improvements in algorithm in order to ignore short term speaker switches.

In another embodiment, the meeting service 104 may be an instant messaging (IM) conference service, in which case active participant detection is based on the IM sender and the message sending time.

Utilization of a participant notification component 105 as part of the meeting service 104 is one option; however, an active participant detection component 106 can be provided outside the meeting service 104, by voice and/or video streams analysis. The output of both these components is participant identification with timestamps relating to the raw data. Additional information can be added manually.

Voice analysis can be carried out using a voice recognition component and matching between speaker voice and voice samples in a repository.

Video analysis is relevant only for video conference systems, and uses face detection technology on a speaker image. Speaker image can be detected by using part of video frames. In most video conferencing systems, an active speaker is located in a specific part of a video frame or is marked with a bold frame. Video analysis can also detect lips activity.

If participant data is not enough to get unique participant identification, additional components can be involved, such as an enterprise directory. The raw participant data can be used to find unique participant identification.

A meeting analysis system 110 is provided including a receiver 111 for receiving raw activity data 117 and participant identification 118 from the meeting service 104 and/or from a participant detection component 106.

There are several possible ways to connect the receiver 111 to a meeting service 104. One way is to connect directly to a notification component 105, using a protocol supported by this component, for example using XML (Extensible Markup Language) over TCP (Transmission Control Protocol). Another way is to connect as an additional participant, being passive during the meeting and monitoring the same data as other participants receive.

The meeting analysis system 110 may process the raw activity data 117 in real time, or may include a storage medium 112 for storing the raw activity data 117 for later processing.

In one embodiment, the meeting analysis system 110 may receive raw activity data in the form of audio or video stream data. In such cases, the meeting analysis system 110 may include an automatic speech recognition (ASR) component 119 for converting audio stream data into a transcript and a combiner component 120 to combine the output transcript with speaker activity timestamps in order to match speakers and their spoken text.

For basic operation of the system, a transcript of audio stream data may not be required and the meeting analysis system 110 may operated on speaker timings. However, for an advanced sub-activities detection using speech analysis and topic detection, transcription is required.

The meeting analysis system 110 includes a sub-activity detection component 113 for detecting sub-activities in a meeting including a clustering component 114 for clustering participants into sub-groups who participate in a sub-activity.

The sub-activity detection component 113 may use various components and techniques to divide the raw data into sub-activities including: a time proximity component 121, a speech analysis component 122, a text analysis component 123, a topic detector 124, a tagging component 125, and a filtering component 126. The speech analysis component 122 may include an emotion detection component. The text analysis component 123 may include an emotion detection component in the form of emoticon interpretation. The operation of these components is described further below.

The meeting analysis system 110 also includes a connection strength calculating component 115 for calculating a weighting between co-participants in a meeting, and an integration component 116 for integrating participant weighting results into social network services.

Figure 2:
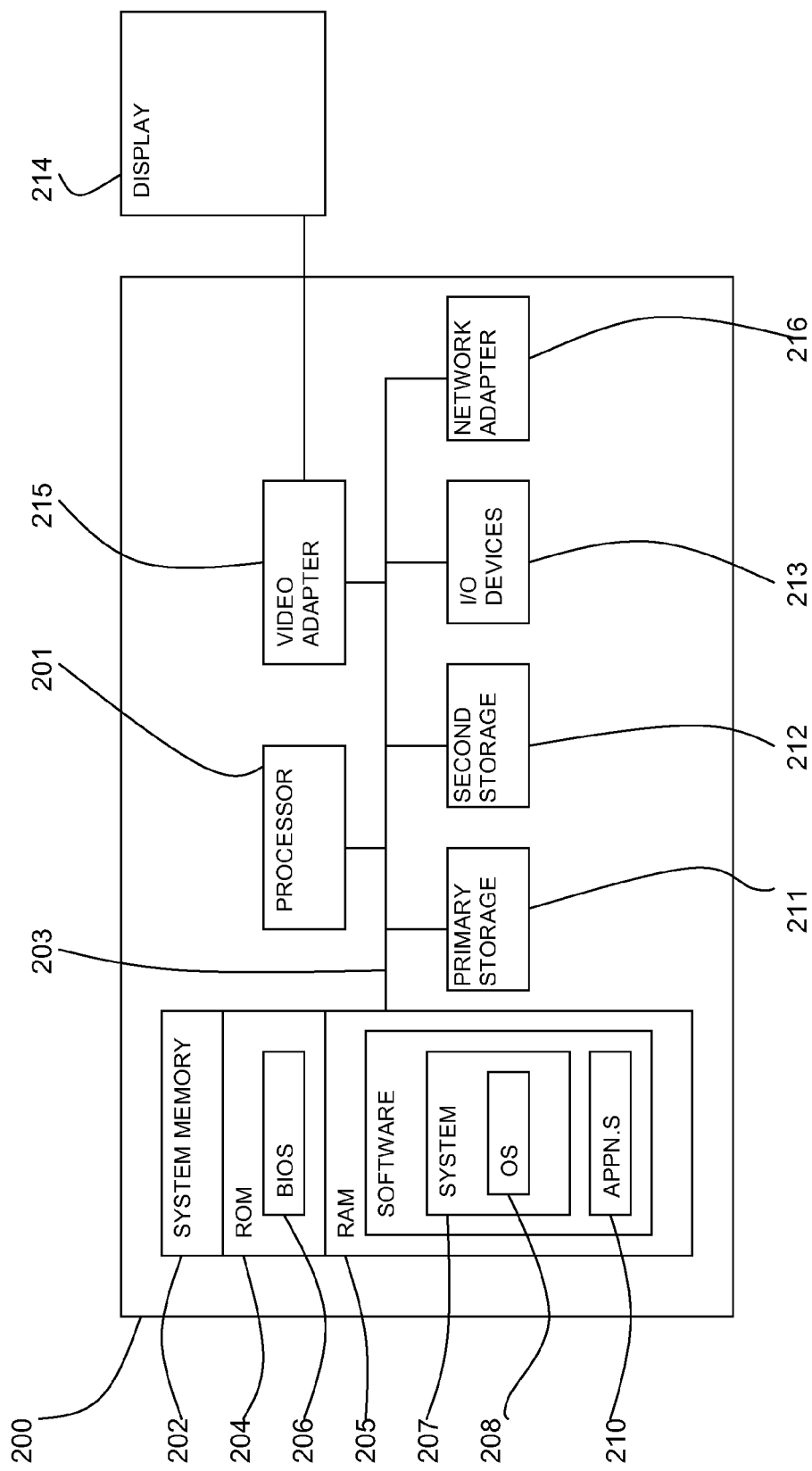
FIG. 2 is a block diagram of a computer system in which the present invention may be implemented.

Referring to FIG. 2, an exemplary system for implementing aspects of the invention includes a data processing system 200 suitable for storing and/or executing program code including at least one processor 201 coupled directly or indirectly to memory elements through a bus system 203. The memory elements can include local memory employed during actual execution of the program code, bulk storage, and cache memories which provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 208. Software applications 210 may also be stored in RAM 205.

The system 200 may also include a primary storage means 211 such as a magnetic hard disk drive and secondary storage means 212 such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 may operate in a networked environment using logical connections to one or more remote computers via a network adapter 216.

Input/output devices 213 can be coupled to the system either directly or through intervening I/O controllers. A user may enter commands and information into the system 200 through input devices such as a keyboard, pointing device, or other input devices (for example, microphone, joy stick, game pad, satellite dish, scanner, or the like). Output devices may include speakers, printers, etc. A display device 214 is also connected to system bus 203 via an interface, such as video adapter 215.

Figure 3:
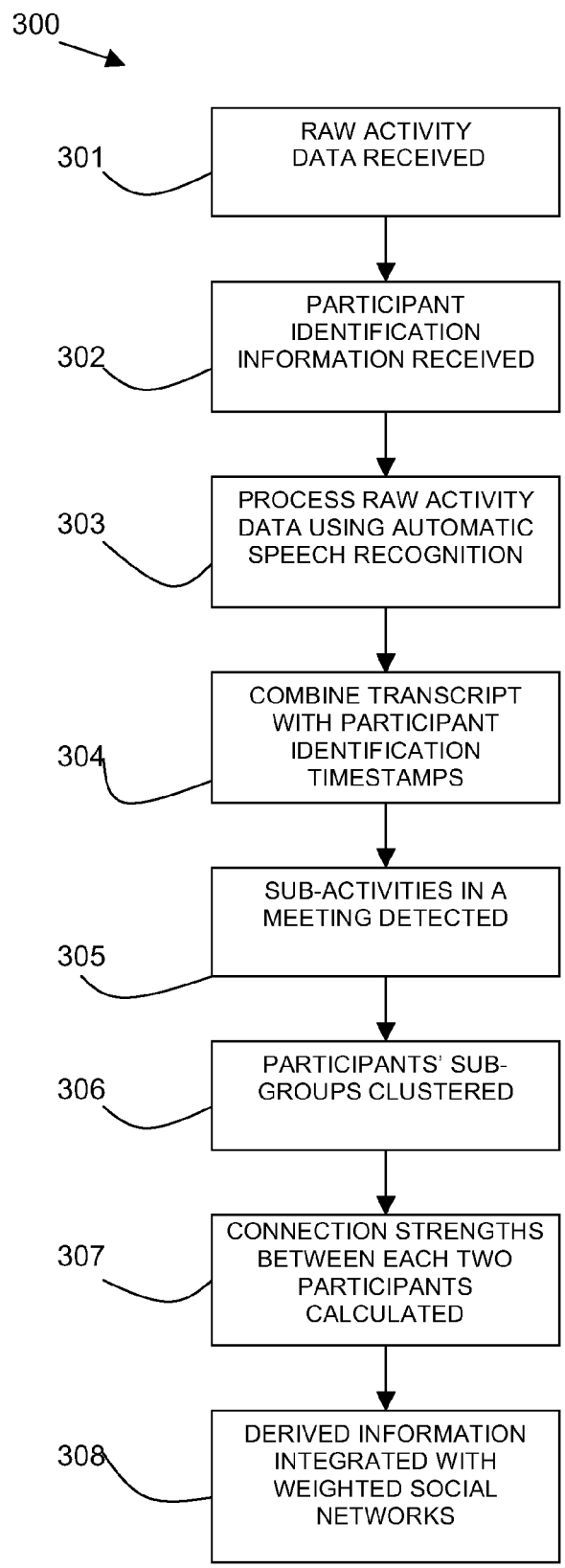
FIG. 3 is a flow diagram of a method in accordance with the present invention.

Referring to FIG. 3, a flow diagram 300 shows a method of analysing social information from multi-party meetings. The described method may be carried out in real-time during the meeting, or applied off-line to a capture/recording of the meeting.

Raw activity data is received 301 from a meeting conference. The raw activity data may be a stream of audio or text. Participant identification information is also received 302.

For video and audio conference systems, a raw activity data in the form of a raw audio stream can be passed through automatic speech recognition (ASR) process 303.

An output transcript or incoming raw text data is combined 304 with participant activity timestamps, in order to match between participants and their text/transcript. For example, participant identification may be provided by active participant notification from a conferencing tool or a separate active participant detection component using timestamps. For instant messaging conference systems matching between participants and their inputs is straightforward.

The relevant sub-activities in a meeting are detected 305. Participants in a sub-activity are clustered 306 into subgroups. Connection strengths between each two participants are calculated 307 focusing on identified sub-groups.

The derived information is integrated 308 with weighted social networks.

The step of detecting sub-activities can be done using multiple techniques, such as: time proximity of participants' contributions, speech pauses, speech analysis, text analysis, and topic detection, emotion detection, etc.

One technique is based on speech pauses and time proximity of participants' contributions. On a first iteration, raw sub-activities can be detected by using speech pauses. On a second iteration, the method can go over a meeting timeline to detect the points where most recent speakers were replaced by other speakers, using a predefined detection window size. In this way a raw sub-activities will be split to smaller sub-activities.

Speech analysis and topic detection can improve the method by detecting additional points for segmentation or by adding confidentiality to a technique.

Additional information that may be utilized is speaker emotions. This information can be detected by passing an audio stream through emotions detection component or by detection of common emotions signs in chat systems.

Text analytics may be applied to a transcript of the meeting, to see if the two or more participants are agreeing or disagreeing on the subject (regardless to the subject discussed) in order to detect stronger connection between participants with the same view on a subject.

If the subject can be derived as well by methods of analytics, it can be automatically added as a tag by a tagging component to the relevant participants of specific sub-activity, to be used as output for additional retrieval systems.

To improve the method, some sub-activities may be filtered-out, such as initial gathering (when everyone says "hello" and states his name) and final stage (when every one says "bye" and "thanks"). This can be a very primitive filtering, based on time only, for example 5% of time, or very short activities; or can be more sophisticated, based on speech analysis ant text analytics.

The step of calculating a connection weight with another participant is carried out by using some or all of the following parameters:
  1. Participation in same sub-activity.
  2. Number of common sub-activities.
  3. Number of direct interactions, e.g. question/answer, comment, etc.

As in the sub-activities detecting step, advanced speech/text/transcript analysis methods can be applied here.

The step of integration of the derived information with social network services may be done using standard methods. It can be implemented as service, providing an interface for queries for specific participants/meetings/dates. The system can provide raw log information only, letting social networks to calculate weights by using another heuristics.

Figure 4:
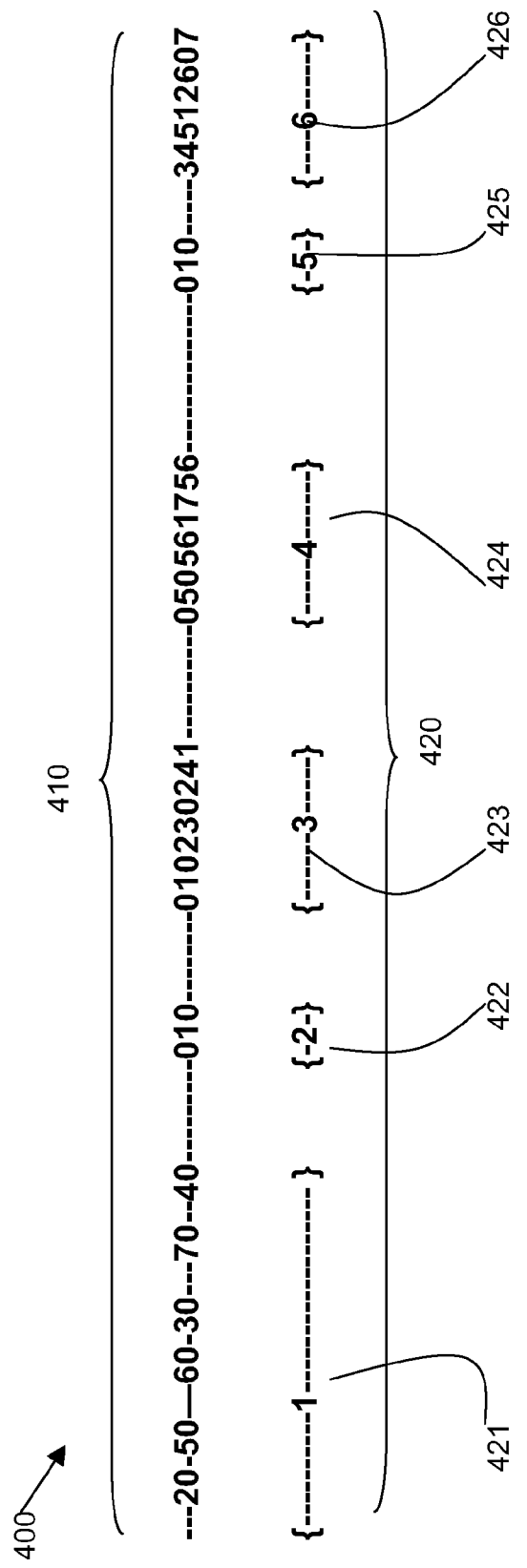
FIG. 4 is a schematic diagram of a time line of a meeting in accordance with the present invention.

An example is shown in FIG. 4 in a schematic representation of a meeting timeline 400. The raw activity data 410 is shown in the top line with the following participants represented:

Reviewers: 0,1
Group 1 participants: 2,3,4
Group 2 participants: 5,6,7

The sub-activities 420 are detected as shown in the bottom line with sub-activities 421-426. Sub activities 1 421 and 6 426 are filtered as meeting greeting and leaving salutations. Sub-activities 2 422, 3 423, 4 424, 5 425 are used for connection weight calculations.

Participants 0 and 1 will get a very high connection weight between them, as participating in all sub-activities, and a relatively high weight with all other participants as participation in common sub-activities and direct interactions.

Participants 2,3,4 will have a relatively high connection weight due to common sub-activity and direct interaction, but a low weight for connections with 5,6,7.

Participants 5, 6, 7 will have a relatively high connection weight due to common sub-activity and direct interaction, but a low weight for connections with 2, 3, 4.

The main advantage of this approach is that it obtains more accurate social connection information and makes social networks more accurate and dynamically updated with little or no user interaction in maintaining the social information knowledge. It will help weighted social networks to calculate connection strength more accurately and to order search results in better way.

A social network weighting system may be provided as a service to a customer over a network.

The invention can take the form of an entirely hardware embodiment, or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

We claim:

1. A method for social analysis in multi-participant meetings, comprising:
  receiving a data stream of a multi-participant meeting having participants, wherein multiple topics are discussed;

analyzing the data stream to detect one of the topics and to define topical sub-activities of the one topic, the topical sub-activities being performed by at least a portion of the participants;

identifying respective contributions to the one topic by two of the participants in the topical sub-activities associated therewith;

making an evaluation of the respective contributions to selected ones of the topical sub-activities; and calculating a connection weight between the two participants based on the evaluation of the respective contributions, wherein said receiving, analyzing, identifying, making and calculating steps are implemented in either computer hardware, or computer software embodied in a non-transitory, tangible, computer-readable storage medium.

2. The method according to claim 1, wherein identifying respective contributions comprises determining a number of the topical sub-activities common to the two participants.

3. The method according to claim 1, wherein identifying respective contributions comprises determining a number of interactions between the two participants.

4. The method according to claim 1, wherein analyzing the data stream comprises identifying the participants and clustering the identified participants into sub-groups for respective ones of the topical sub-activities, the method further comprising providing indications of the sub-groups and connection weights among pairs of the participants in the sub-groups to a social network.

5. The method according to claim 1, wherein analyzing the data stream to define topical sub-activities comprises:
identifying the participants;
demarcating the topical sub-activities by speech pauses of the identified participants; and
subdividing the demarcated topical sub-activities by detecting replacement times wherein one speaker is replaced by another speaker among the identified participants.

6. The method according to claim 1, wherein the topical sub-activities comprise one of a greeting and a leaving salutation that occur at a beginning and at a termination of the meeting, respectively, further comprising the steps of excluding the greeting and the leaving salutation when identifying respective contributions.

7. The method as claimed in claim 1, wherein making an evaluation comprises emotion detection of the two participants.

8. The method as claimed in claim 1, wherein detecting a sub-activity is based on at least one of speech analysis and text analysis.

9. The method as claimed in claim 1, wherein making an evaluation comprises detection of an agreement or disagreement between the two participants, and calculating a connection weight is performed responsively to the agreement or disagreement.

10. The method as claimed in claim 1, wherein analyzing, identifying, making an evaluation and calculating are performed during the meeting.

11. A computer software product, including a non-transitory computer-readable storage medium in which computer program instructions are stored, which instructions, when executed by a computer, cause the computer to perform the steps of:
receiving a data stream of a multi-participant meeting having participants, wherein multiple topics are discussed;
analyzing the data stream to detect one of the topics and to define topical sub-activities of the one topic, the topical sub-activities being performed by at least a portion of the participants;
identifying respective contributions to the one topic by two of the participants in the topical sub-activities associated therewith;
making an evaluation of the respective contributions to selected ones of the topical sub-activities;
calculating a connection weight between the two participants based on the evaluation of the respective contributions; and
reporting the connection weight, wherein said receiving, analyzing, identifying, making and calculating steps are implemented in either computer hardware, or computer software embodied in a non-transitory, tangible, computer-readable storage medium.

12. The computer software product according to claim 11, wherein identifying respective contributions comprises determining a number of the topical sub-activities common to the two participants.

13. The computer software product according to claim 11, wherein identifying respective contributions comprises determining a number of interactions between the two participants.

14. The computer software product according to claim 11, wherein analyzing the data stream comprises identifying the participants and clustering the identified participants into sub-groups for respective ones of the topical sub-activities, wherein the instructions cause the computer to perform the additional steps of providing indications of the sub-groups and connection weights among pairs of the participants in the sub-groups to a social network.

15. The computer software product according to claim 11, wherein analyzing the data stream to define topical sub-activities comprises:
identifying the participants;
demarcating the topical sub-activities by speech pauses of the identified participants; and
subdividing the demarcated topical sub-activities by detecting replacement times wherein one speaker is replaced by another speaker among the identified participants.

16. The computer software product according to claim 11, wherein the topical sub-activities comprise one of a greeting and a leaving salutation that occur at a beginning and at a termination of the meeting, respectively, wherein the instructions cause the computer to perform the additional steps of excluding the greeting and the leaving salutation when identifying respective contributions.

17. The computer software product as claimed in claim 11, making an evaluation comprises detection of an agreement or disagreement between the two participants, and calculating a connection weight is performed responsively to the agreement or disagreement.

18. A data processing system, comprising:
a processor comprising:
a receiver for raw activity data, the data comprising an audio stream;
an automatic speech recognition component for processing the audio stream;
a topic detector;
a sub-activity detection component; and
a connection strength calculating component, wherein the processor is operative to perform the steps of:
with the receiver receiving a data stream of a multi-participant meeting having participants, wherein multiple topics are discussed;

using the topic detector and the sub-activity detection component, analyzing the data stream to detect one of the topics and to define topical sub-activities of the one topic, the topical sub-activities being performed by at least a portion of the participants;

identifying respective contributions to the one topic by two of the participants in the topical sub-activities associated therewith;

making an evaluation of the respective contributions to selected ones of the topical sub-activities; and using the connection strength calculating component for calculating a connection weight between the two participants based on the evaluation of the respective contributions.

19. The data processing system according to claim 18, wherein analyzing the data stream comprises identifying the participants and clustering the identified participants into sub-groups for respective ones of the topical sub-activities, wherein the processor is operative to perform the additional steps of providing indications of the sub-groups and connection weights among pairs of the participants in the sub-groups to a social network.

20. The data processing system according to claim 18, wherein analyzing the data stream to define topical sub-activities comprises:

identifying the participants;

demarcating the topical sub-activities by speech pauses of the identified participants; and subdividing the demarcated topical sub-activities by detecting replacement times wherein one speaker is replaced by another speaker among the identified participants.

* * * * *